United States Patent [19]

May

[11] Patent Number: 4,950,569

[45] Date of Patent: Aug. 21, 1990

[54] ELECTROPHOTOGRAPHIC IMAGE ENHANCEMENT USING LUMINESCENT OVERCOATS

[75] Inventor: John W. May, Rochester, N.Y.

[73] Assignee: Eastman Kodak Company, Rochester, N.Y.

[21] Appl. No.: 459,612

[22] Filed: Jan. 2, 1990

[51] Int. Cl.$^5$ .............................................. G03G 13/22
[52] U.S. Cl. ........................................ 430/31; 430/54; 430/494; 430/396; 430/967; 430/394; 430/67; 378/28; 358/241; 358/456; 250/362; 250/459.1
[58] Field of Search ................. 430/31, 494, 396, 394, 430/967, 54

[56] References Cited

U.S. PATENT DOCUMENTS 4,482,619 11/1984 Bayer ..................................... 430/84
4,877,699 10/1989 Young et al. .......................... 430/54

Primary Examiner—J. David Welsh
Attorney, Agent, or Firm—Warren W. Kurz

[57] ABSTRACT

The photoconductive layer of an electrophotographic plate, such as used to record radiographic patterns, is overcoated with a thin dielectric layer having luminescing (e.g., fluorescing or phosphorescing) properties. Upon being uniformly charged and imagewise exposed to actinic radiation (i.e. radiation to which the photoconductive layer responds), the resulting charge pattern is developed with toner. The toner-bearing surface of the electrophotographic plate is irradiated with radiation adapted to excite the luminescent overcoat. The toner image serves, in effect, to mask any luminescence by the underlying overcoat, thereby giving rise to a luminescent contrast image which may be recovered by laser scanning or CCD techniques, or photographed directly.

16 Claims, 2 Drawing Sheets

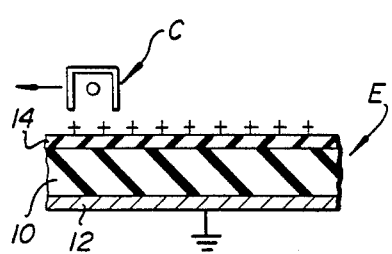
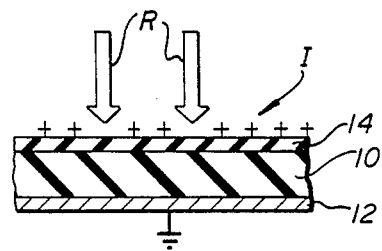
FIG. 1A    FIG. 1B
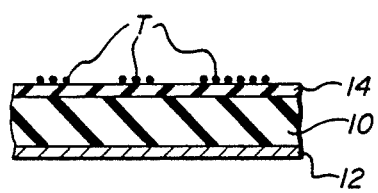
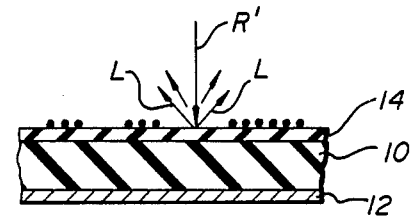
FIG. 1C    FIG. 1D
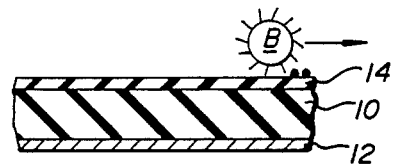
FIG. 1E
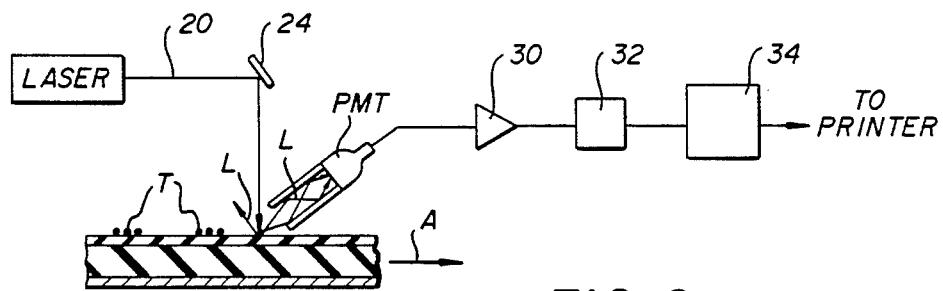
FIG. 2

ELECTROPHOTOGRAPHIC IMAGE ENHANCEMENT USING LUMINESCENT OVERCOATS

BACKGROUND OF THE INVENTION

The present invention relates to the field of electrophotography and, more particularly, to a process for enhancing the contrast and density of an image recorded on an electrophotographic plate or recording element.

The conventional electrophotographic process has inherently lower gain than the silver halide photographic process. A low exposure in a conventional electrophotographic process results in a low amplitude differential voltage pattern on a photoconductor, and when developed with conventional toner, the resulting toned image has correspondingly low density and contrast. It has been a longstanding goal to increase the gain of the electrophotographic process so that higher density images may be produced from low exposures. This goal is of particular interest in applications such as diagnostic xeroradiography where the exposing x-rays pose a potential health threat to the patient, and the lowest exposure possible is desired.

In addition to conventional xeroradiographic processes, there are other electrophotographic processes that produce relatively weak differential patterns of voltage, charge, current, or conductivity and for which increases in gain or photographic speed are desirable. Such electrophotographic processes include, for example, photoelectrophoresis, as disclosed in U.S. Pat. No. 4,361,636; ionography, as disclosed in U.S. Pat. No. 4,070,577; and ion projection, as disclosed in U.S. Pat. No. 4,338,614.

It has been proposed to increase the gain of an electrophotographic system, particularly a xeroradiographic system, by amplifying a low amplitude differential voltage image produced by a low x-ray exposure. See, for example, U.S. Pat. No. 3,981,727. Here, amplification of a low amplitude differential voltage pattern is achieved by first developing such pattern with an opaque toner. The photoconductor, with toner image in place, is again uniformly charged and then uniformly illuminated to reexpose the photoconductor using the toned image as a mask. The reexposed image is then further developed by applying additional toner to increase the density range of the image. While this amplification technique is theoretically capable of producing a threefold or fourfold increase in image density, it does so at the expense of requiring repetitive charge and exposure steps.

SUMMARY OF THE INVENTION

In view of the foregoing, an object of this invention is to provide a method of producing a relatively high density, high contrast image from a relatively weak differential charge pattern produced by electrophotographic techniques without requiring the multiple charge and exposure techniques which characterize the prior art.

Another object of this invention is to provide a novel electrophotographic recording element which is useful in the process of the invention to produce high contrast images.

According to the present invention, the second object above is achieved by the provision of an electrophotographic plate having a special dielectric overcoat which is capable of luminescing (i.e., fluorescing or phosphorescing) when exposed to certain exciting radiation. The first object is achieved by an electrophotographic process which includes the steps of providing an electrophotographic plate with such a luminescence stimulable overcoat, electrostatically charging the plate to provide a uniform charge layer thereon, imagewise exposing the uniform charge to a radiation pattern (e.g., x-rays) to produce a latent electrostatic image, developing such electrostatic image with toner, and irradiating the toner-bearing overcoat of the plate with stimulating radiation to cause the exposed regions (i.e., those regions not covered by toner) to luminesce preferentially, thereby providing the means for obtaining a higher contrast, more readily-detectable image of the differential charge pattern previously recorded by imagewise exposure of the electrophotographic plate.

The invention and its various advantages will become more apparent to those skilled in the art from the ensuing detailed description of a preferred embodiment, reference being made to the accompanying drawings.

BRIEF DESCRIPTION OF THE DRAWINGS

FIGS. 1A–1E are schematic illustrations of the steps comprising the electrophotographic image-enhancing process according to a preferred mode of practicing the invention;

FIG. 2 is a schematic illustration of a technique for digitizing the image information recorded by the process of the invention;

DETAILED DESCRIPTION OF PREFERRED EMBODIMENTS

Figure 3:
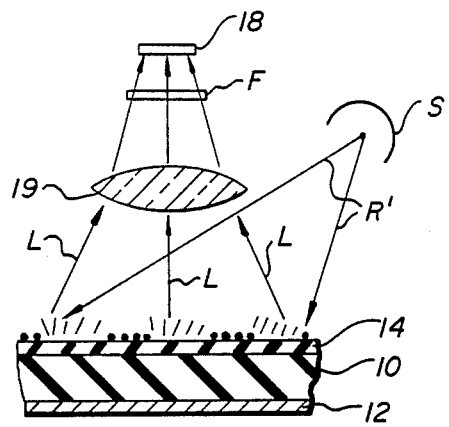
FIG. 3 schematically illustrates an alternative mode for carrying out the process illustrated in FIGS. 1A–1E.

Referring now to the drawings, the various steps of the electrophotographic process of the invention are schematically illustrated in FIGS. 1A–1E. As shown in FIG. 1A, an electrophotographic recording element E is uniformly electrostatically charged by scanning the recording element with a corona charger C, as is well known in the art. The recording element comprises a photoconductor layer 10 having a grounded electrically conductive backing 12. It is also possible to apply a potential to the electrically conductive backing 12, if so desired. On the top surface of the photoconductor 10 is a luminescent overcoat 14, i.e., an overcoat comprising a material which gives off, such as by fluorescing or phosphorescing, radiation of a predetermined wavelength or band of wavelengths when excited or stimulated by actinic radiation of another wavelength. While the photoconductive layer may comprise any photoconductive material known in the art, the process of the invention is particularly adapted to enhance the relatively weak or faint images produced, for example, by diagnostic x-rays. Thus, the photoconductive layer is preferably sensitive to x-radiation, and preferred photoconductive materials include selenium, selenium-tellurium alloys, lead-oxide, mercury oxide, bismuth oxide mixed with other oxides and the like. Overcoat 14 preferably comprises a dielectric polymer film in which a luminescing dye is dissolved. Alternatively, overcoat 14 may comprise a dielectric film, preferably a polymeric film, in which a luminescing powder is dispersed. There are a large number of dye/binder combinations which can be used to provide a suitable overcoat. Suitable dyes include the fluoresceins, eosins, rhodamines, etc., as well as certain rare-earth chelates. Suitable binders are any of the polymeric binders commonly used in the formation of electrophotographic elements, including polyesters, polyamides, polyurethanes, etc., and copolymers thereof. Ideally, the luminescent overcoat should be thin, preferably less than 1 micron, highly insulating, non-turbid, non-absorbing to the radiation used to create the latent electrostatic image, e.g., x-radiation, and non-charge-injecting into the underlying photoconductor of carriers of the same polarity as the corona charge. When used in a scanning read-out process (described below), the luminescence of the overcoat should exhibit a fast rise time and decay time. To protect the underlying photoconductor, the overcoat is preferably hard and scratch resistant. Also, for some applications, it may be desirable that the overcoat exhibit Photoconductive properties so that, after the image recording and read-out processes, any residual and trapped charges can be discharged by exposing the overcoat to actinic radiation which causes it to change from a dielectric to a photoconducting layer.

Upon uniformly charging the overcoat side of the recording element, the latter is imagewise exposed (FIG. 1B) to a radiation R (e.g., x-rays) to which the photoconductive layer is responsive and the overcoat is transmissive. Such imagewise exposure serves to imagewise discharge the uniform charge on the recording element, leaving behind a developable charge image I. The charge image is developed with a dry or liquid toner, in a well known manner, to produce a visible, but perhaps very faint, toner image T (see FIG. 1C). While pos-pos imaging is illustrated in which the unexposed areas are toned, obviously a neg-pos imaging system can be used. Preferably, the toner used to develop the charge pattern is totally opaque; however, it may be Partially transmissive to either the luminescence itself and/or the luminescence stimulating radiation. The amount of toner applied to any selected area depends upon the level of charge of such area. If the toner is partially transmissive, a multilayer toner deposit may be necessary to extend the grey scale response of the system.

According to this invention, the contrast and density of such visible image may be enhanced by irradiating the toner-bearing overcoat 14 with actinic radiation R' adapted to excite the luminescing material in the overcoat, causing luminescence L to be emitted by the irradiated portions of the overcoat. Depending on the type of luminescing material in the overcoat and the intensity of the actinic radiation, the overcoat luminescence may persist for a time period of between nanoseconds and several minutes. The toner, being preferably opaque to both the actinic radiation R' and the luminescence radiation L, acts as a mask, the purpose of which is to prevent the actinic radiation from striking the underlying overcoat, and to minimize any unavoidable luminescence of the overcoat in regions underlying the toner from being detected by the read-out system.

In the preferred embodiment, as illustrated in FIGS. 1D and 2, the stored image is recovered by using the scanning apparatus described in the commonly assigned U.S. Ser. No. 280,793, filed Dec. 7, 1988 and entitled ELECTROPHOTOGRAPHIC PROCESS FOR GENERATING AN ELECTRICAL IMAGE SIGNAL. Referring now to FIG. 2, the luminescent overcoat is excited by the actinic radiation in R' in FIG. 1D by scanning with a beam of stimulating radiation 20, e.g. such as generated by a laser 22. The laser beam is deflected by a rotatable mirror 24, while the recording element is moved in the direction of arrow A to effect a raster scan of the luminescent overcoat. The angle of mirror 24 can be adjusted to control the angle of incidence of the exciting radiation in order to maximize the luminescence contrast. Photons (luminescence) emitted by the overcoat are collected and detected by a light collector of the type comprising a mirror box 26 which serves to direct the emitted photons to a photomultiplier tube PMT or photodiode. A filter 28 over the face of the PMT blocks the exciting radiation and passes emitted radiation. As is well known in the art, the electrical image signal produced by the photomultiplier tube may be amplified by an amplifier 30, and digitized by an analog to digital converter 32 and digital image processing electronics 34. The digital image processing electronics 34 may implement any of the known digital image processing operations on the digital image signal, such as tone scale adjustment, edge and contrast enhancement, and noise reduction. To obtain output hard copy, the processed digitized electrical image signal may be used to drive an output laser printer. It is evident that the total amplification of the present system is controlled by several factors, including the density of the masking toner image, the luminescent brightness of the overcoat, the intensity of the exciting beam 20, the power of the laser 22, the amplification from amplifier 30, and the gain associated with the output device, such as a laser printer, which produces the final pattern of density in the recorded image (hard copy).

Returning now to FIG. 1E, the recording element may be cleaned by a brush B or the like of the toner image to render it reusable in a subsequent image-recording process.

An alternative to the laser scanning technique is shown in FIG. 3. A source S of actinic radiation R' flood irradiates the recording element and the glowing image is recorded by a conventional charge-coupled-device (CCD) array 8. An optical bandpass filter F is used to transmit only the luminescence wavelengths, thereby blocking the stimulating radiation, and a lens 19 may be used to focus the luminescent image onto the CCD 18.

Note the inventive process is somewhat similar to the image enhancement process disclosed in U.S. Pat. No. 2,817,767 to J. F. Rosenthal. In that patent, fluorescent toner is applied to a charge pattern and the resulting toner image is irradiated with fluorescence stimulating U.V. radiation. Compared to that process, however, the process of the present invention is advantageous in that there is no need for a costly, specialized luminescent toner which, in the former process, is discarded after each imaging process. In the Rosenthal patent, the image contrast is enhanced via transfer to paper where the image is viewed conventionally.

Figure 4:
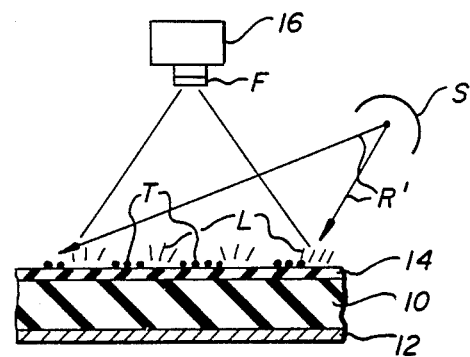
FIG. 4 is a schematic illustration of a method to amplify the image information photographically.

In another embodiment of the present invention, as shown in FIG. 4, the luminescing background contrasted against the toner image may be photographed by a camera 16 to record the image on a photographic medium. An optical bandpass filter F is used to transmit only the luminescence wavelength, thereby blocking the stimulating radiation. It may be appreciated that the source S provides a blanket flood illumination of exciting radiation, R'. If the decay time of the luminescence L is very short, then the camera 16 is operated simultaneously with the excitation R'. On the other hand, if the luminescence L is long lived (phosphorescence) the camera 16 may be operated after a time interval from the time the excitation R' has been terminated, and at some other location, if desired. Direct contact exposure of the phosphorescent image to a photographic film also can be carrier out. Moreover, the luminescent image produced by blanket exposure can be captured by a charged photoconductor, and then toned conventionally to produce an amplified output hard copy image.

In the present invention, the toner is not transferred, giving the advantage over conventional xeroradiography that the toner image remains complete and undisturbed, thereby maximizing the information retrievable from the image.

The invention has been described in detail with particular reference to preferred embodiments thereof, but it will be understood that variations and modifications can be effected within the spirit and scope of the invention.

I claim:

1. An electrophotographic recording process comprising the steps of:
    (a) providing a photoconductive recording element comprising a photoconductive layer having an overcoat containing a luminescence-stimulable material, said material being responsive to luminescence-exciting incident actinic radiation to produce luminescence at a predetermined wavelength;
    (b) forming a charge pattern on such overcoat by exposing the recording element to an imagewise pattern of actinic radiation, e.g. a pattern of x-rays;
    (c) applying a toner to such overcoat to render the charge pattern visible, said toner being absorptive to both said luminescence-exciting actinic radiation and said luminescence;
    (d) irradiating the toned overcoat to said actinic radiation to create an imagewise luminescence pattern modulated by the toner; and
    (e) imagewise recording the resulting differences in luminescent intensity from the irradiated overcoat.

2. The process as defined by claim 1 wherein said irradiating step comprises flood irradiating such overcoat with luminescence-stimulating radiation.

3. The process as defined by claim 1 wherein said imagewise recording step comprises the step of imaging the luminescence pattern onto photographic film.

4. The process as defined by claim 1 wherein said imagewise recording step comprises the step of imaging the luminescence pattern onto a charged second photoconductor and toning the resultant electrostatic image on said second photoconductor.

5. The process as defined by claim 1 wherein said irradiating step comprises scan-irradiating the overcoat with luminescence-stimulating radiation, and said recording step comprises detecting the luminescence produced by such scan-irradiating step.

6. The process as defined by claim 5 wherein said recording step includes subsequent production of hard copy imagery from the detected luminescence pattern.

7. The process as defined by claim 6 wherein the recording step includes capturing the luminescent pattern with a charge-coupled device (CCD).

8. The process as defined by claim 7 in which the said recording step includes subsequent production of hard copy imagery from the detected luminescence pattern.

9. A xeroradiographic process comprising the steps of:
    (a) providing a photoconductive recording element comprising an x-ray sensitive photoconductive layer having an overcoat containing a luminescence-stimulable material, said material being responsive to incident actinic radiation to produce luminescence at a predetermined wavelength;
    (b) imagewise exposing said photoconductive layer to an x-ray pattern to form a developable charge pattern.,
    (c) developing such charge pattern with toner onto the overcoat, said toner being absorptive to both said actinic radiation and said luminescence;
    (d) irradiating the toned overcoat to actinic radiation to create an imagewise luminescence pattern, the intensity of such pattern being modulated by the toner; and
    (e) imagewise recording the differences in luminescent intensity from the irradiated overcoat.

10. The process as defined by claim 9 wherein said irradiating step comprises flood irradiating such overcoat with luminescence-stimulating radiation.

11. The process as defined by claim 9 wherein said recording step comprises the step of imaging the overcoat onto photographic film.

12. The process as defined by claim 9 wherein said irradiating step comprises scan irradiating the overcoat with luminescence-stimulating radiation, and said recording step comprises detecting, pixel-by-pixel, the luminescence produced by such scan-irradiating step.

13. The process as defined by claim 9 where the recording step includes subsequent production of hard copy imagery from the detected luminescence.

14. The process as defined by claim 9 in which the recording step includes capturing the luminescent pattern with a charge-coupled device (CCD).

15. An electrophotographic recording element comprising a photoconductive layer having an overcoat containing a luminescence-stimulable material.

16. The recording element as defined by claim 15 wherein said photoconductive layer comprises selenium or selenium compounds and alloys.

* * * * *